(12) United States Patent
Delrieu et al.

(10) Patent No.: US 12,337,723 B2
(45) Date of Patent: Jun. 24, 2025

(54) ELECTRIC POWERTRAIN COOLING ASSEMBLY AND COOLING ASSEMBLY OPERATING METHOD

(71) Applicant: Dana Heavy Vehicle Systems Group, LLC, Maumee, OH (US)

(72) Inventors: Frederic Delrieu, Montreal (CA); Martin Keighan, Laval (CA); Jeremy Lempert, Toronto (CA); Martin Houle, Laval (CA)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 573 days.

(21) Appl. No.: 17/660,589

(22) Filed: Apr. 25, 2022

(65) Prior Publication Data
US 2022/0348111 A1    Nov. 3, 2022

Related U.S. Application Data

(60) Provisional application No. 63/181,090, filed on Apr. 28, 2021.

(51) Int. Cl.
*B60K 1/04* (2019.01)
*B60K 1/00* (2006.01)
(Continued)

(52) U.S. Cl.
CPC ............... *B60L 58/33* (2019.02); *B60K 1/00* (2013.01); *B60K 1/04* (2013.01); *B60K 11/06* (2013.01); *B60L 1/003* (2013.01); *B60L 50/75* (2019.02); *B60L 53/22* (2019.02); *B60L 58/18* (2019.02); *B60L 58/26* (2019.02); *B60L 58/30* (2019.02);
(Continued)

(58) Field of Classification Search
CPC ...... B60L 58/33; B60L 68/40; B60L 2240/36; B60K 1/00; B60K 1/04; B60K 11/06; H01M 8/04007; H01M 2250/20
See application file for complete search history.

(56) References Cited

U.S. PATENT DOCUMENTS 4,931,947 A      6/1990   Werth et al.
6,329,090 B1 *  12/2001   McElroy ............ H01M 8/04119
                                                        429/514
(Continued)

FOREIGN PATENT DOCUMENTS

DE    102019008255 A1   6/2020
EP         2581249 A1   4/2013
JP       2003257441 A   9/2003

*Primary Examiner* — Jason D Shanske
*Assistant Examiner* — James J Triggs
(74) *Attorney, Agent, or Firm* — McCoy Russell LLP

(57) ABSTRACT

Methods and systems are provided for cooling a hydrogen fuel cell assembly. A vehicle system, in one example, includes a hydrogen fuel cell assembly electrically coupled to a traction motor, positioned behind a cab, and including a plurality of hydrogen storage tanks and hydrogen fuel cells. The vehicle system further includes a fuel cell cooling assembly including an inlet manifold in a deflector, where the deflector is fixedly coupled to and positioned vertically above the cab and designed to direct airflow to a fan array that is coupled to a fuel cell assembly heat exchanger, where the fan array is positioned behind inlet manifold and longitudinally offset therefrom.

20 Claims, 7 Drawing Sheets

(51) Int. Cl.

| | | |
|---|---|---|
| *B60K 11/06* | (2006.01) | |
| *B60L 1/00* | (2006.01) | |
| *B60L 50/75* | (2019.01) | |
| *B60L 53/22* | (2019.01) | |
| *B60L 58/18* | (2019.01) | |
| *B60L 58/26* | (2019.01) | |
| *B60L 58/30* | (2019.01) | |
| *B60L 58/33* | (2019.01) | |
| *B60L 58/40* | (2019.01) | |
| *B60R 16/023* | (2006.01) | |
| *H01M 8/04007* | (2016.01) | |
| *H01M 8/04302* | (2016.01) | |
| *H01M 8/04303* | (2016.01) | |
| *H01M 8/0432* | (2016.01) | |
| *H01M 8/04537* | (2016.01) | |
| *H01M 8/04955* | (2016.01) | |
| *H01M 10/48* | (2006.01) | |
| *H01M 10/613* | (2014.01) | |
| *H01M 10/625* | (2014.01) | |
| *H01M 16/00* | (2006.01) | |
| *H01M 50/249* | (2021.01) | |

(52) U.S. Cl.
  CPC .......... *B60L 58/40* (2019.02); *B60R 16/0238* (2013.01); *H01M 8/04007* (2013.01); *H01M 8/04302* (2016.02); *H01M 8/04303* (2016.02); *H01M 8/0432* (2013.01); *H01M 8/04626* (2013.01); *H01M 8/04955* (2013.01); *H01M 10/48* (2013.01); *H01M 10/613* (2015.04); *H01M 10/625* (2015.04); *H01M 16/006* (2013.01); *H01M 50/249* (2021.01); *B60K 2001/005* (2013.01); *B60K 2001/0405* (2013.01); *B60K 2001/0494* (2013.01); *B60L 2210/10* (2013.01); *B60L 2240/12* (2013.01); *B60L 2240/36* (2013.01); *B60L 2240/54* (2013.01); *H01M 2220/20* (2013.01); *H01M 2250/20* (2013.01)

(56) References Cited

U.S. PATENT DOCUMENTS

| | | |
|---|---|---|
| 6,448,535 B1 | 9/2002 | Ap |
| 6,580,977 B2 | 6/2003 | Ding et al. |
| 7,252,166 B2 | 8/2007 | Kubusch et al. |
| 7,273,120 B2 | 9/2007 | Tabata |
| 7,434,611 B2 * | 10/2008 | Wunderlich ....... B60H 1/00428 237/12.3 A |
| 7,543,454 B2 | 6/2009 | Harris |
| 7,810,595 B2 | 10/2010 | Moran et al. |
| 8,027,759 B2 | 9/2011 | Saeki et al. |
| 8,148,952 B2 | 4/2012 | Schaffnit |
| 8,347,645 B1 | 1/2013 | Miller |
| 8,511,407 B2 | 8/2013 | Jeon et al. |
| 8,602,141 B2 | 12/2013 | Yee et al. |
| 8,822,093 B2 | 9/2014 | Kim et al. |
| 9,895,999 B2 | 2/2018 | Ohashi |
| 10,442,297 B2 | 10/2019 | Brown et al. |
| 10,957,920 B2 | 3/2021 | Sato et al. |
| 2006/0101645 A1 | 3/2006 | Stone |
| 2011/0136026 A1 | 6/2011 | Betts et al. |
| 2020/0185735 A1 | 6/2020 | Kim et al. |
| 2021/0155224 A1* | 5/2021 | McKibben ............. B60L 50/75 |
| 2021/0179176 A1 | 6/2021 | Kim |

* cited by examiner

ELECTRIC POWERTRAIN COOLING ASSEMBLY AND COOLING ASSEMBLY OPERATING METHOD

CROSS-REFERENCE TO RELATED APPLICATION

The present application claims priority to U.S. Provisional Application No. 63/181,090, entitled "ELECTRIC POWERTRAIN AND METHOD FOR OPERATION OF SAID POWERTRAIN", and filed on Apr. 28, 2021. The entire contents of the above-listed application are hereby incorporated by reference for all purposes.

FIELD

The present description relates generally to methods and systems for an electric powertrain with a fuel cell cooling assembly.

BACKGROUND AND SUMMARY

Electric powertrains have previous utilized either battery technology or fuel cells to provide electric energy for a traction motor. Both electric vehicle technologies do not generate hydrocarbon emissions during vehicle operation, which may provide an attractive alternative to vehicles with internal combustion engines when taking into account environmental factors during vehicle design.

US 2021/0155224 A1 to McKibben et al. discloses a heavy duty vehicle with a power distribution system that may include both a traction battery and a fuel cell system for additional energy storage. The vehicle further includes coolant modules for the fuel cell system that includes radiators and fans. The coolant modules are positioned below the fuel cell system and on a lateral side of the vehicle near a battery system. The heavy duty vehicle further includes motors for each of the drive wheels in the rear axle.

However, the inventors have identified several drawbacks with McKibben's heavy duty vehicle as well as other electric vehicles. McKibben's cooling system may be susceptible to degradation from external factors such as road debris. Positioning the coolant modules below the fuel cell system may present packaging challenges due to the surrounding systems such as the battery assembly. Further, the coolant modules may not achieve desired thermodynamic behavior due to their positioning, which may decrease fuel cell operating efficiency. Still further, the inventors have recognized that positioning the coolant modules below the fuel cells and storage tanks may present challenges to efficiently installing the both the fuel cell system and the traction batteries. The vehicle's modularity may be decreased, as a result.

The inventors have recognized the abovementioned challenges and developed a vehicle system. The vehicle system includes, in one example, includes a hydrogen fuel cell assembly that is electrically coupled to a traction motor, positioned behind a cab, and including multiple hydrogen storage tanks and hydrogen fuel cells. The system further includes a fuel cell cooling assembly with an inlet manifold in a deflector. In the system, the deflector is fixedly coupled to and positioned vertically above the cab and designed to direct airflow to a fan array that is coupled to a fuel cell assembly heat exchanger. Further in the system, the fan array is positioned behind inlet manifold and longitudinally offset therefrom. In this way, the fuel cell arrangement may be more efficiently cooled using an over-cab cooling assembly when compared to fuel cell cooling systems that are positioned below the fuel cell assembly. Positioning the fuel cell cooling system over the cab also reduces the chance of degradation of the cooling assembly's components when compared to cooling fans positioned below the fuel cells.

Further, in one example, the deflector may include multiple slats that extend across an opening of the inlet manifold. In such an example, one or more of the slats are angled with regard to a longitudinal axis. In this way, a desired flow pattern with increased efficiency is directed to the fan array to decrease the fan's power consumption, thereby increasing cooling system efficiency.

Further in one example, the hydrogen fuel cell assembly may be positioned within a frame that is fixedly coupled to a vehicle chassis. Further in such an example, the hydrogen storage tanks are positioned vertically below the hydrogen fuel cells and within the frame. Positioning the storage tanks and fuel cells in this manner allows the hydrogen to be more efficiently routed to the fuel cells when compared to fuel cell systems that position the storage tanks above the fuel cells. In such an example, the storage tanks may be positioned longitudinally along a length of the vehicle and above a vehicle chassis. Positioning the storage tanks in this manner, enables the tank's storage capacity to be increased when compared to lateral hydrogen storage tanks. Further, positioning the fuel cell components in the frame allows the fuel cell assembly's modularity to be increased, thereby increasing the system's adaptability.

Even further in one example, the fan array may include multiple fans arranged perpendicular to a forward direction of vehicle travel. In this way, the cooling assembly's efficiency may be increased via an increased airflow generated during vehicle travel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A fuel cell cooling arrangement and associated systems that achieve a higher level of cooling and efficiency in comparison to previous cooling systems are described herein. To achieve the high level of heat rejection and efficiency, the fuel cell cooling arrangement is positioned above a hydrogen fuel cell assembly that is positioned behind a vehicle cab. This fuel cell cooling arrangement includes an inlet manifold positioned vertically above the cab and in fluidic communication with a fan array that is designed to drive airflow to a fuel cell assembly heat exchanger. The cooling arrangement further includes a deflector with inlets that are designed to guide ram air, generated during vehicle travel, to the fan arrays. To form inlets, the deflector may include slats that extend across a front opening. The attack angle of the slats may be selected to strike a desired balance between airflow through the fuel cell cooling system and vehicle drag. Positioning the cooling components in this manner allows air to be efficiently directed through the cooling fans and permits the energy use of the cooling fans to be reduced, if desired.

Figure 1:
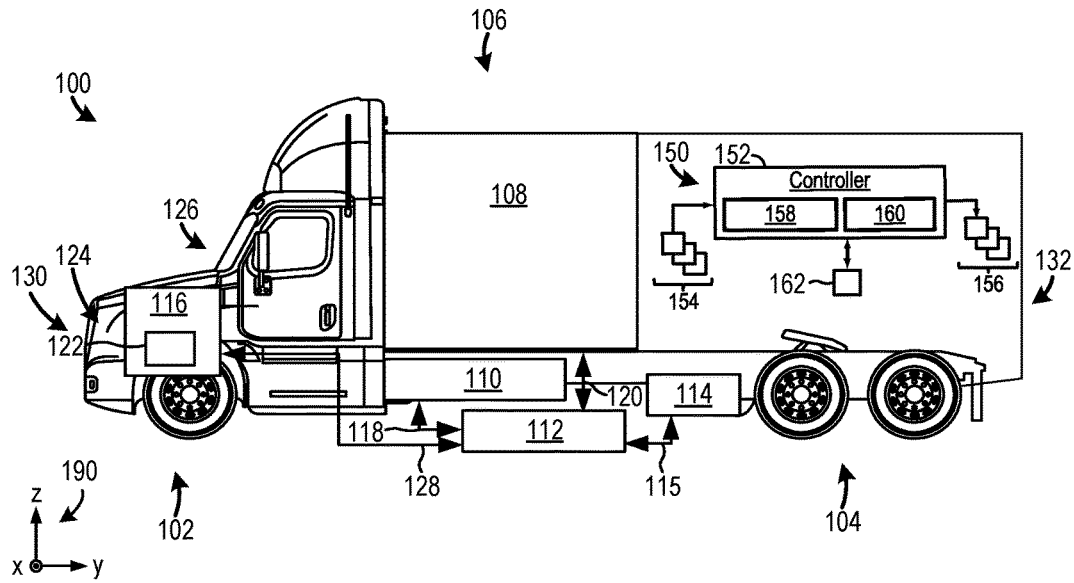
FIG. 1 shows an illustration of an electric vehicle (EV) with modular electric propulsion system components that are schematically depicted.
Figure 2:
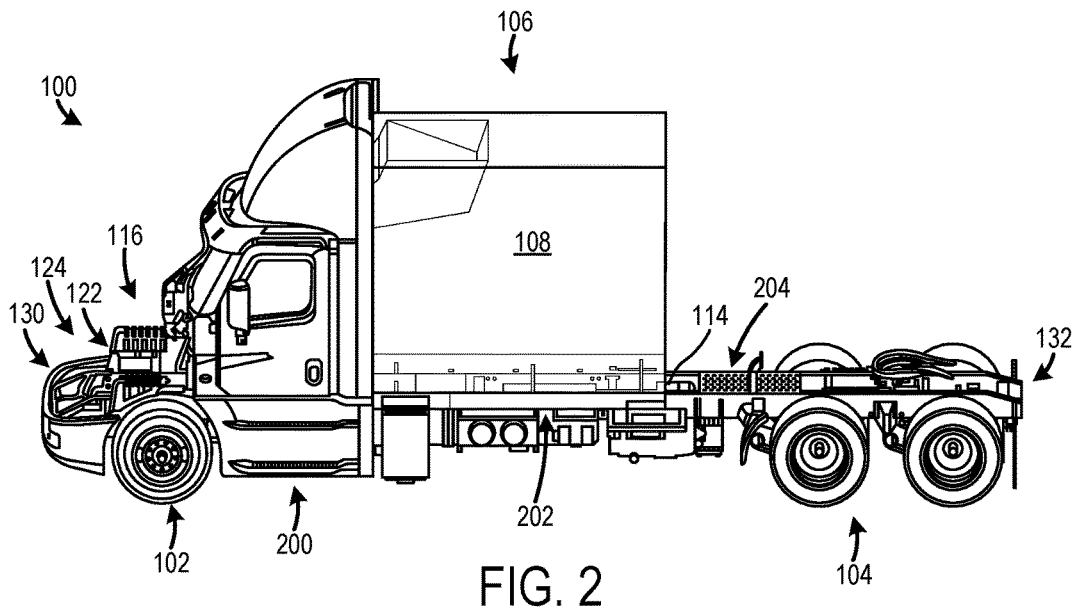
FIG. 2 shows an illustration of the EV, depicted in FIG. 1, with exemplary detailed illustrations of the electric propulsion system components.
Figure 3:
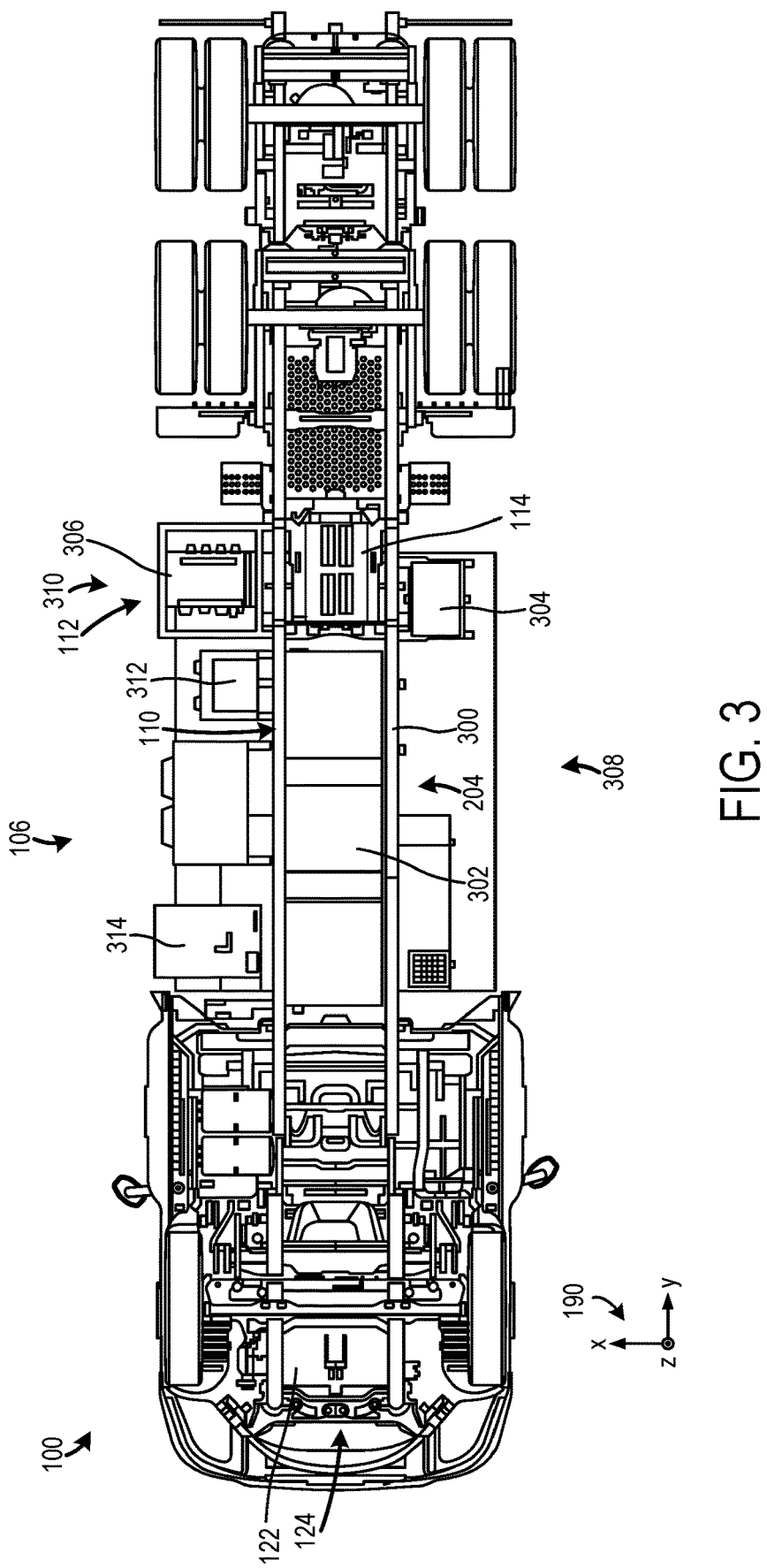
FIG. 3 shows a bottom view of the EV, depicted in FIG. 2.
Figure 4:
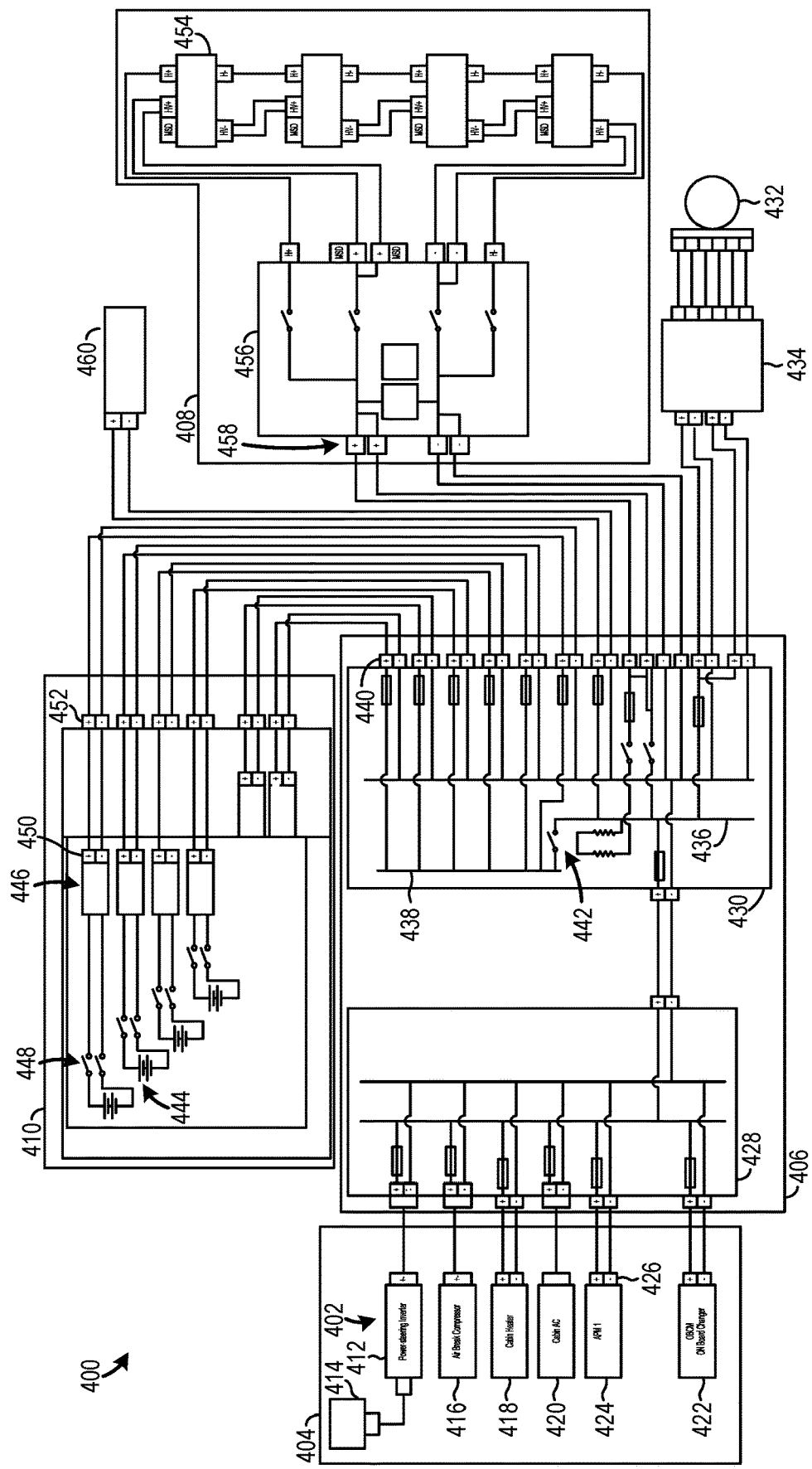
FIG. 4 shows a diagram of an electrical circuit in an electric vehicle system.
Figure 9A:
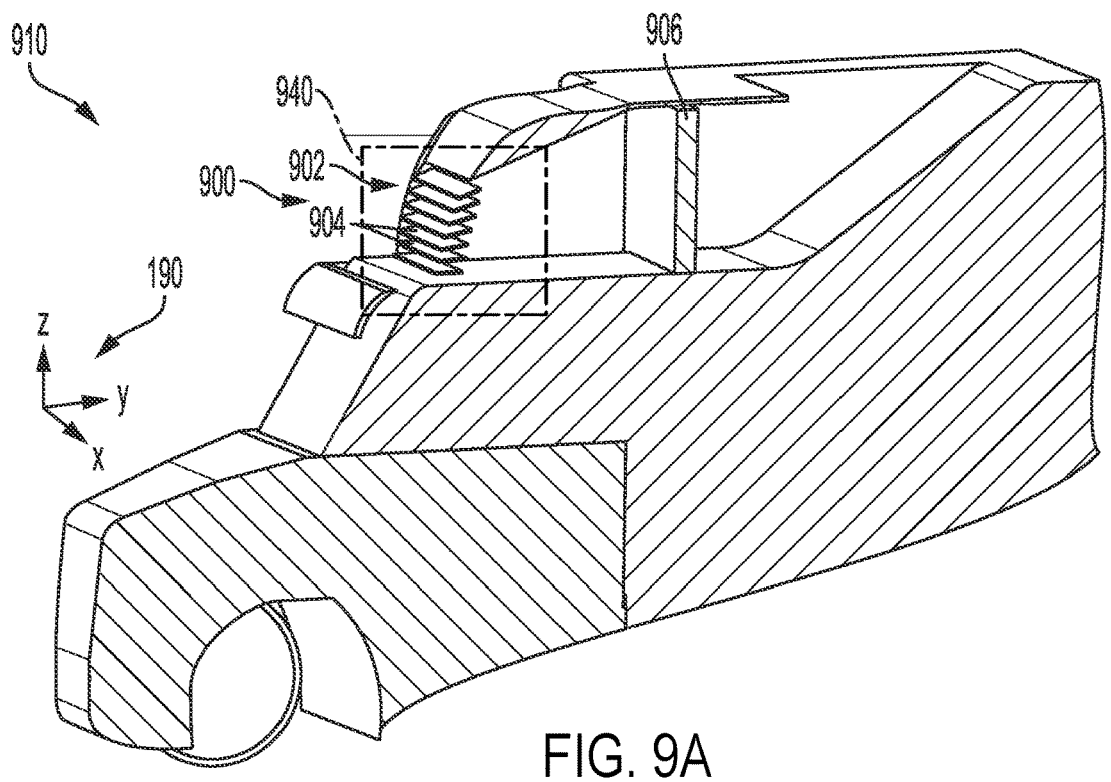
FIGS. 9A-9B show different views of a fuel cell cooling system with a deflector that includes slats.
Figure 10:
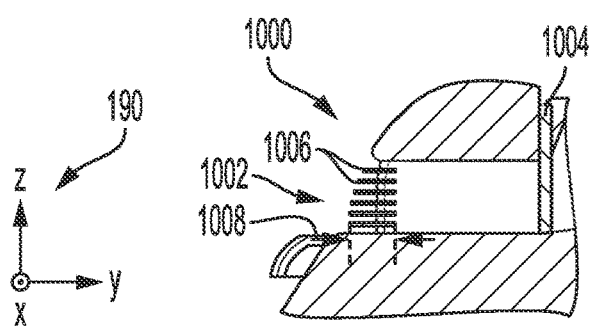
FIG. 10 shows another example of a deflector with slats.
Figure 11:
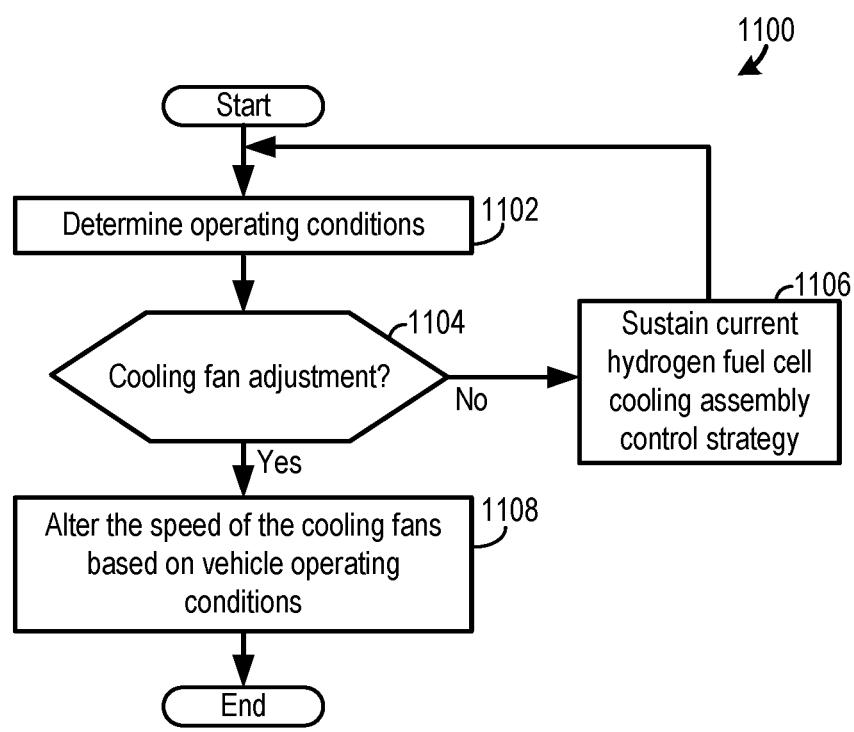
FIG. 11 shows a method for operation of a fuel cell cooling.

FIG. 1 shows an example of a vehicle designed with modular electric propulsion assemblies. FIG. 2 shows a detailed illustration of the vehicle and electric propulsion assemblies, depicted in FIG. 1. FIG. 3 shows a bottom view of the traction battery assembly and other associated system which are included in the vehicle depicted in FIG. 2. FIG. 4 shows the electronic architecture for electric propulsion assemblies that allows the system to achieve a high level of adaptability. FIGS. 5-8 shows different views of a cooling system for the electric propulsion assemblies of a vehicle. FIGS. 9A-10 show different examples of an over-cab deflector. FIG. 11 shows a method for operation of fuel cell cooling system. FIGS. 2-3 and 5-10 are drawn approximately to scale. However, alternate relative component dimensions may be used, in other embodiments.

FIG. 1 illustrates an electric vehicle (EV) 100 with a modular architecture. Specifically, the vehicle may be an all-electric vehicle which does not include an internal combustion engine. The EV 100 is illustrated as a heavy duty vehicle (e.g., a semi-truck) in FIG. 1. A heavy duty vehicle may be classified as any vehicle with a gross vehicle weight rating (GVWR) equal to or greater than 14,969 kilograms (kg). However, in other examples, the vehicle may take a variety of forms such as a light or medium duty vehicle, an on-road or off-road vehicle, and the like. As such, the vehicle may include multiple axles, one of which is a front axle 102 which may be steerable. A rear tandem axle 104 is further depicted in FIG. 1. At least one of the rear axles may be a drive axle, in one example. However, in other examples, numerous axle arrangements in the vehicle have been contemplated. For instance, the vehicle may include a different number of axles and/or axle types.

The EV 100 may have different electric propulsion assemblies which have a modular design. One or more of these assemblies may be included in a vehicle system 106. This modular design allows the propulsion unit configuration to be efficiently altered at a later stage in manufacturing than previous electric vehicle designs which have more design rigidity and are therefore less adaptable. Consequently, the vehicle's propulsion systems may be efficiently altered at a later stage in manufacturing to more efficiently meet the demands of specific end users. Thus, the configuration of the electric propulsion system may be efficiently tailored to achieve a wider variety of end-use design goals, thereby expanding customer appeal.

The electric propulsion assemblies in the EV 100 may include a hydrogen fuel cell assembly 108, a traction battery assembly 110, an electric distribution assembly 112, a traction motor 114 (e.g., motor-generator), and/or an electric accessory assembly 116. Electric energy may be transferred between the hydrogen fuel cell assembly, the traction battery assembly, the electric distribution assembly, the traction motor, and/or the electric accessory assembly based on vehicle operating conditions. For instance, during certain conditions when the traction batteries are below a threshold state of charge, the hydrogen fuel cell assembly may be used to recharge the traction batteries, thereby extending the vehicle's range.

The hydrogen fuel cell assembly 108 and the traction battery assembly 110 are electrically coupled to the electric distribution assembly 112 as denoted via arrows 118, 120, respectively. As such, electrically energy may be transferred between these assemblies. To expound, the hydrogen fuel cell assembly 108 and the traction battery assembly 110 are coupled to the electric distribution assembly 112 in parallel.

Connecting the hydrogen fuel cell assembly and the traction battery assembly to the electric distribution assembly in parallel permits the vehicle to be adapted for use as a hydrogen fuel cell electric vehicle (FCEV), a battery electric vehicle (BEV), or vehicle using both fuel cell and battery systems in tandem. In this way, the vehicle platform may be efficiently tailored for end-use design goals at a later stage in the manufacturing process, if desired. In the case of a vehicle using both fuel cell and battery assemblies, characteristics from both fuel cell and battery electric vehicles may be comingled to mitigate or in some cases avoid unwanted compromises between refueling/recharging characteristics and electric drive performance, for instance. For example, when the vehicle includes both the fuel cell and battery systems, the vehicle may use a wider infrastructure network for recharging or refueling. Consequently, the vehicle's applicability, range, and/or efficiency may be increased when both battery and fuel cell systems are incorporated in the vehicle.

The electric distribution assembly 112 is further electrically coupled to the traction motor 114, as denoted by arrows 115. A suitable traction motor may be used such as an alternating current (AC) motor that receives power from an inverter. It will be understood that the traction motor 114 is designed to deliver mechanical power to drive wheels (e.g., drive wheels in the rear drive axle assembly). A transmission, gearbox, and/or other suitable powertrain components may be used to accomplish this power transfer functionality.

The traction battery assembly 110 may include one or more batteries and/or other suitable energy storage devices such as capacitors. The battery assembly 110 may further include a heater and contactors that allow the individual battery packs to be heated and selectively disconnected.

The vehicle system 106 may further include electric accessories 122 which may be positioned in a cradle 124 of the vehicle in front of the cab 126 and are electrically coupled to the electric distribution assembly 112, denoted by arrows 128. These electric accessories 122 may include a power steering inverter, an air brake compressor, a cabin heater, a cabin cooler, a power steering pump, an on board charger, combinations thereof, and the like.

The vehicle may include a control system 150 with a controller 152. The controller 152 may receive signals from sensors 154 coupled to various regions of the EV 100. For example, the sensors 154 may include wheel speed sensors, battery temperature sensors, battery state of charge (SOC) sensor, an accelerator pedal sensor, a brake pedal sensor, fuel cell voltage sensors, and the like. Upon receiving the signals from the various sensors, the controller processes the received signals, and employs various actuators 156 of vehicle components to adjust the components based on the received signals and instructions stored on the memory of controller. The controller may include a processor 158 and memory 160 that includes various circuits such as microprocessors, memory units, data buses, input-output ports, and the like. As such the memory of the controller may have instructions stored therein that, when executed by the processor, cause the controller to perform various methods and control techniques described herein. The memory may include known data storage mediums such as random access memory, read only memory, keep alive memory, combinations thereof, and the like. An input device 162 (e.g., control pedal(s) such as brake and/or accelerator pedals, a gear selector, an ignition key, combinations thereof, and the like) may further be in electronic communication with the controller 152. The controller 152 and associated control system may be used for control of any of the vehicle systems described herein with regard to FIGS. 2-10.

An axis system 190 is provided in FIG. 1, as well as in FIGS. 2-3 and 5-10, for reference. The z-axis may be a vertical axis (e.g., parallel to a gravitational axis), the x-axis may be lateral axis (e.g., a horizontal axis), and/or the y-axis may be a longitudinal axis, in one example. However, the axes may have other orientations, in other examples. The terms in front and behind denote the relative position of a component along the longitudinal axis or an axis parallel to the y-axis. In this regard, a front side 130 and a rear side 132 of the vehicle are denoted in FIGS. 1 and 2.

FIG. 2 shows a detailed view of the EV 100 with exemplary illustrations of the vehicle system components such as the electric accessories 122 of the electric accessory assembly 116, the hydrogen fuel cell assembly 108, the electric distribution assembly 112, the traction motor 114, and the traction battery assembly 110. As shown, the electric accessories 122 are positioned in the cradle 124 in front of the cab 126. In this way, the accessories may be efficiently incorporated into the vehicle at a location that may impose less space constraints on other vehicle systems. It will be understood, that the cradle 124 may be positioned above the front axle 102.

The hydrogen fuel cell assembly 108 is positioned behind the cab 126 and in front of the tandem axle 104. In this way, the fuel cell assembly may be protected and is positioned in a location that interferes to a lesser degree with the attachment and/or sizing of a trailer that may be coupled to the vehicle during freight transport.

The traction battery assembly 110 is positioned vertically below the hydrogen fuel cell assembly 108 (e.g., directly below the hydrogen fuel cell assembly and behind the cab). Further, the traction battery assembly 110 may be positioned behind side bars 200, thereby permitting the vehicle operator to more easily enter the cab when compared to electric vehicles that position battery packs directly below the cab. Still further, the traction battery assembly 110 may be incorporated into a section 202 of the chassis 204. Positioning the traction battery assembly 110 into the chassis may allow for increased protection of the batteries from environmental degradation, such as degradation from road debris.

FIG. 3 shows a bottom view of the EV 100. The chassis 204 of the vehicle is again depicted which includes frame rails 300 (e.g., longitudinal rails) between which battery packs 302 in the traction battery assembly 110 are positioned. The traction motor 114 may further be positioned behind the battery packs 302 and between the frame rails 300. A motor inverter 304 and the junction box 306 may be positioned on opposing lateral sides 308, 310 of the chassis 204. A junction box 312 in the electric distribution assembly 112 and/or an air compressor 314 may also be positioned on one lateral side of the chassis. In this way, vehicle system 106 may achieve more even weight distribution when compared to vehicles with other battery pack arrangements. The vehicle's handing performance may be consequently increased. FIG. 3 further shows the electric accessories 122 in the cradle 124.

The electric vehicle system 106 shown in FIGS. 1-3 is highly adaptable and permits the hydrogen fuel cell assembly to be quickly incorporated into and removed from the vehicle, as desired. In this way, the vehicle may be efficiently altered at a later stage in manufacturing to accommodate for the end-use design targets of the customers. For instance, the vehicle may be efficiently adapted for use as a BEV or FCEV.

FIG. 4 shows a circuit diagram of a vehicle system 400. It will be appreciated that the circuit diagram serves as an example of the circuitry in the vehicle system 106, depicted in FIGS. 1 and 2. The vehicle system 106 shown in FIG. 1 and the vehicle system 400 shown in FIG. 4 may therefore have at least some overlapping components that have a similar function and/or structure. Redundant description of these components is omitted for concision.

The vehicle system 400 may again include electric accessories 402 in an accessory assembly 404, an electric distribution assembly 406, a traction battery assembly 408, and a hydrogen fuel cell assembly 410. The electric accessories 402 may include a power-steering inverter 412 coupled to a power-steering pump 414, an air brake compressor 416, a cabin heater 418, a cabin AC unit 420, an on board charger 422, an auxiliary power module 424, and/or the like. Each of the accessories include electrical ports 426 that enable connection between the accessories and a front junction box 428 (e.g., a front high voltage distribution box) included in the electric distribution assembly 406. The electric distribution assembly 406 may further include a rear junction box 430 (e.g., a rear high voltage distribution box). In some examples, the high voltage distribution boxes may distribute approximately 24 volts to the components which are electrically coupled thereto. However, other operating voltages have been contemplated.

The front junction box 428 is electrically coupled to the traction battery assembly 408 and the motor 432 and inverter 434 via bus 436 (e.g., a vehicle bus). Another bus 438 (e.g., a fuel cell bus) may be used to electrically couple the rear junction box 430 to the hydrogen fuel cell assembly 410. Each of these connections may be established via ports 440 in the junction box.

A fuel cell assembly contactor 442 may be positioned between the bus 436 and the bus 438 to allow the traction battery assembly 408 and motor 432 to be selectively electrically isolated from the fuel cell assembly 410.

The hydrogen fuel cell assembly 410 may include multiple fuel cells 444 that may be connected to DCDC converters 446 via contactors 448. To elaborate, a contactor may be positioned between each fuel cell and a DCDC bus. The DCDC converters 446 each include connectors 450 that are connected to ports 452 of the hydrogen fuel cell assembly 410. The use of the DCDC converters allows for the use of smaller cabling throughout the vehicle system as opposed to a more centralized solution. The ports 452 are connected to the ports 440 in the junction box associated with the fuel cell bus 438.

The traction battery assembly 408 may include multiple power packs 454. The power packs may be coupled in parallel and/or series. Further, a connection box 456 or other suitable electrical arrangement may serve as an electrical interface between ports 458 of the traction battery assembly 408 and the power packs 454.

A battery chiller 460 may further be included in the traction battery assembly 408 or more generally in the vehicle system 400. The battery chiller 460 may be electrically coupled to the vehicle bus 436. The battery chiller 460 is designed to reduce the temperature of the battery packs.

Figure 5:
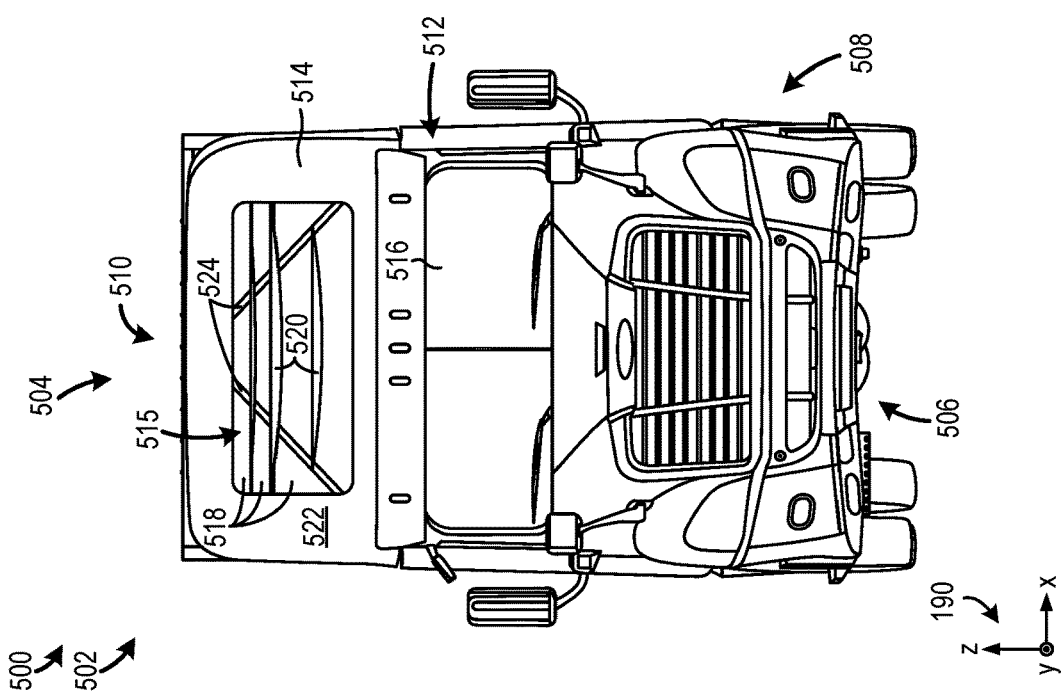

FIG. 5 shows another example of a vehicle 500 with electric propulsion assemblies 502. The electric propulsion assemblies 502 again may include a hydrogen fuel cell assembly 504, a traction battery assembly 506, and/or an electric distribution assembly 508. At least a portion of the components in the vehicle 500 and corresponding electric propulsion assemblies 502 may have similar structure and/or function to the EV 100 and corresponding electric propulsion assemblies depicted in FIGS. 1-2. As such, redundant description of these overlapping features will be omitted for brevity.

The electric propulsion assemblies 502 includes a fuel cell cooling assembly 510 which is positioned above a vehicle cab 512. It will be understood that the fuel cell cooling system may be a fuel cell cooling system. The vehicle cab 512 is an operator compartment that may include seats, vehicle controls, a sleeping compartment, an audio system, combinations thereof, and/or the like. The fuel cell cooling assembly 510 specifically includes a deflector 514 that is positioned above a windshield 516 in the cab 512 and fixedly coupled to the cab. The deflector 514 may be coupled to the cab via attachment devices (e.g., bolts, clamps, screws, etc.), welds, and the like.

In contrast to prior wind deflectors, the wind deflector 514 includes an inlet manifold 515 may include multiple air inlets 518 that may be formed via slats 520 (e.g., louvers). As illustrated, the slats 520 laterally extend across a body 522 of the inlet manifold 515. However, slats 520 with other arrangements and profiles have been envisioned. For instance, the slats 520 may vertically extend across a section of the inlet manifold body 522, in other embodiments. Further, in one example, the slats 520 may have a fixed position. For instance, the slats may be arranged at an attack angle. The attack angle may be measured from an axis that is parallel to the y-axis. The angular arrangement of the slats is described in greater detail herein with regard to FIGS. 9A-10. The slats 520 may be support via beams 524 that extend across the inlet manifold body 522.

Figure 6:
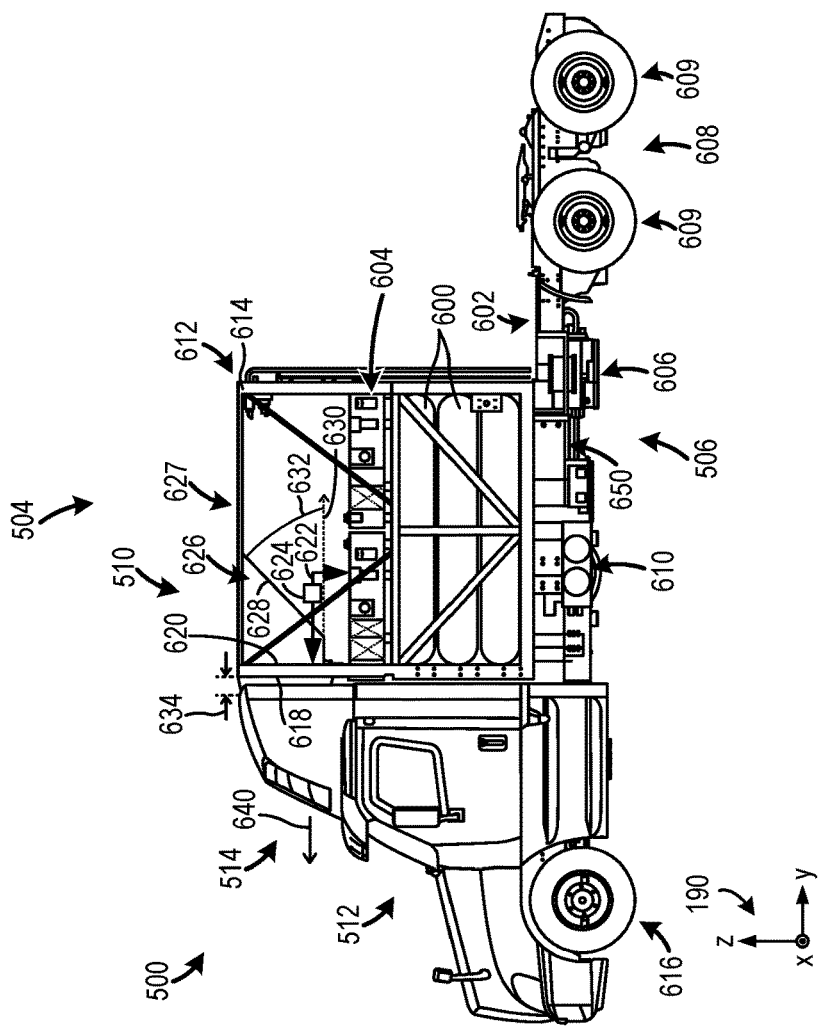
FIGS. 5-8 show different views of an EV with a fuel cell cooling assembly.

FIG. 6 shows a side view of the vehicle 500 with the electric propulsion assemblies. The hydrogen fuel cell assembly 504 is illustrated in FIG. 6. The hydrogen fuel cell assembly 504 includes hydrogen storage tanks 600. The hydrogen storage tanks 600 may be longitudinally arranged along a length of a vehicle chassis 602. This longitudinal hydrogen storage tank arrangement may enable the tanks to be more space efficiently packaged in the vehicle when compared to laterally arranged tanks.

The hydrogen fuel cell assembly 504 further includes fuel cells 604 which may be positioned vertically above the hydrogen storage tanks 600 and receive hydrogen from said tanks. In this way, hydrogen may be efficiently routed between the storage tanks and the fuel cells. Both the fuel cells 604 and the hydrogen storage tanks 600 are positioned behind the cab 512. This fuel cell assembly arrangement enables the fuel cell arrangement to be efficiently installed, accessed for maintenance and repair, and removed. To elaborate, the fuel cell assembly may be installed with little or no spatial interference from other vehicle systems such as the traction batteries 650 and the traction motor 606.

The hydrogen fuel cell assembly 504 provides electric energy to a traction motor 606 (e.g., a traction motor-generator). FIG. 6 further shows the hydrogen fuel cell assembly 504 positioned in front of a rear axle 608 and may provide mechanical power thereto. As such, the rear axle 608 may be the vehicle's drive axle. Positioning the fuel cell assembly in front of the rear axle may enable the vehicle to achieve a more even mass distribution which may enhance vehicle handling.

The rear axle 608 is depicted as a tandem axle. As such, the traction motor 606 may provide mechanical power to one or both of the axles 609 in the tandem axle. However, other rear axle configurations have been contemplated. As illustrated, the fuel cells 604 and hydrogen storage tanks 600 are positioned vertically above the battery assembly 506 as well as the traction motor 606. Consequently, the hydrogen fuel cell assembly may pose less space constraints on the traction motor and associated battery assembly and vice versa. However, other battery and/or traction motor arrangements have been contemplated.

The hydrogen fuel cell assembly 504 may be positioned above the traction battery assembly 506 and/or battery cooler 610. Specifically, a frame 612 which encloses the fuel cell assembly 504 may be coupled to the chassis 602 which may further have traction battery assembly 506 coupled thereto. To elaborate, the traction battery assembly may be efficiently incorporated into the chassis. In this way, both assemblies may be quickly, efficiently, and independently installed and accessed for repair and/or removal. The frame 612 may be coupled to the chassis 602 via welds, attachment devices, combinations thereof, and the like.

The fuel cells 604 and the hydrogen storage tanks 600 may be positioned in and supported by the frame 612. The frame 612 may protect the fuel cell assembly components from degradation as well as increase the modularity of the electric drive system. For instance, packaging the fuel cells 604 and the hydrogen storage tanks 600 in the frame 612 may permit efficient installation and removal to allow for a higher level of adaptability at later stages in manufacturing, if wanted. The frame 612 includes rails 614 (e.g., vertically extending rails, longitudinally extending rails, and the like) that form an enclosure for the fuel cell assembly 504.

A front axle 616 of the vehicle 500 is further shown in FIG. 6. FIG. 6 even further shows the fuel cell cooling assembly 510 including a fan array 618 that is designed to direct air to a heat exchanger 620 (e.g., radiator) and may be coupled thereto. To elaborate, the heat exchanger and the fan array may form a common structure with the fan array which forms a front side of the structure and the heat exchanger forming a rear side of the structure. In this way, these cooling system components may be more rapidly installed and removed during manufacturing, repair, and maintenance, for instance.

The heat exchanger 620 may have a coolant (e.g., a liquid coolant such as water, glycol, combinations thereof, and the like) circulated therethrough that is directed through at least a portion of the fuel cells 604. The heat exchanger may therefore be designed to transfer heat to the air flowing through the cooling system. As such, heat may be efficiently removed from the fuel cells during cooling system operation. Arrows 622 signify the transfer of the coolant between the fuel cells and the heat exchanger. Coolant may therefore be circulated through at least a portion of the fuel cells to permit heat to be removed from the fuel cells. The heat exchanger 620 may be vertically arranged along a plane that is parallel to the x-y plane or otherwise aligned with the fan array 618 to increase the rate of airflow across the heat exchanger. Further, the heat exchanger includes components that enable heat to be transferred from the coolant to the air flow through and/or over the heat exchanger. Fins, coolant conduits, a housing, and/or other suitable components may be included in the heat exchanger that enable heat to be transferred from the coolant to the air.

The fan array 618 and the heat exchanger 620 may be coupled to and housed in the frame 612. Packaging the cooling system components in the frame enables the vehicle system's modularity to be increased by facilitating efficient installation and removal of the fuel cell system and associated cooling arrangement.

A pump 624 may be included in the fuel cell cooling assembly 510. The pump 624 is schematically depicted in FIG. 6, although it will be appreciated that the pump may have greater complexity and may be incorporated into other locations in the vehicle, in alternate examples.

The fan array 618 is positioned vertically above the cab 512 but longitudinally rearward of the cab. This fan array may include multiple fans and is described in greater detail herein with regard to FIG. 7. The outflow of the heat exchanger 620 is directed to an outlet manifold 626. The outlet manifold 626 may include a wall 628 designed to direct air upward and rearward away from the hydrogen fuel cell assembly 504. In this way, airflow may be efficiently directed away from the vehicle. The outlet manifold 626 may be positioned on an upper side 627 of the frame 612.

The wall 628 may be angled with regard to a longitudinal axis 630. To elaborate, the angle 632 may be greater than 30°, in one example. In one specific use-case example, the angle 632 of the wall may be 45°. Profiling the wall in this manner allows airflow to be directed away from the fuel cell system and increase the cooling assembly's efficiency.

Further, the fan array 618 may be longitudinally positioned behind the cab 512 with a gap 634 between the deflector 514 and the fan array to accommodate for relative movement of the cab and the hydrogen fuel cell assembly 504, to reduce noise, vibration, and harshness (NVH) that is transferred from the fuel cell assembly and specifically the fan array to the cab. Operator satisfaction is consequently increased. The gap 634 may therefore extend vertically to allow the fuel cell and cool system components that may generate NVH during operation spaced away from the cab 512. FIG. 6 further shows a forward direction 640 of vehicle travel. The fan array 618 may be arranged perpendicular to the forward direction of vehicle travel to enable a greater amount of ram air to flow therethrough.

Figure 7:
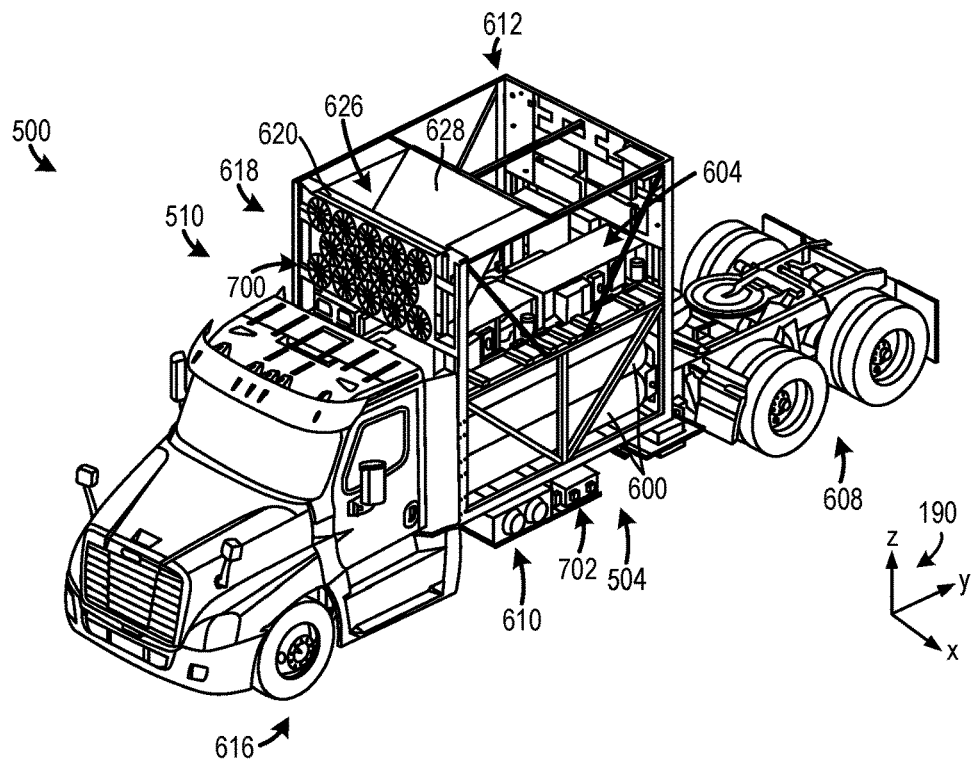

FIG. 7 shows a perspective view of the vehicle 500 with the fuel cell cooling assembly 510, the fuel cells 604, and the hydrogen storage tanks 600. The deflector 514, shown in FIGS. 5-6, has been removed in FIG. 7 as well as FIG. 8 to reveal underlying components in the fuel cell cooling system. The fan array 618 in the fuel cell cooling assembly 510 is illustrated in FIG. 7. The fan array 618 may include one or more rows of fans 700 that may be arranged perpendicular to the vehicle's forward direction of travel. In this way, vehicle movement may drive airflow through the fans, enabling the fuel cell cooling system to be more efficiently operated. The rows of fans 700 may be laterally offset from one another to enable the fans to be more efficiently packaged in the vehicle 500. The heat exchanger 620 and the outlet manifold 626 with the wall 628 is again shown in FIG. 7.

The fan array 618 may also be positioned in the frame 612. In this way, the fan array 618 may be incorporated into the modular hydrogen fuel cell assembly 504. FIG. 7 further shows the traction battery assembly 506 that includes the cooler 610, designed to remove heat from the traction batteries 650, as well as a distribution box 702. The front axle 616 and the rear axle 608 are again illustrated in FIG. 7.

Figure 8:
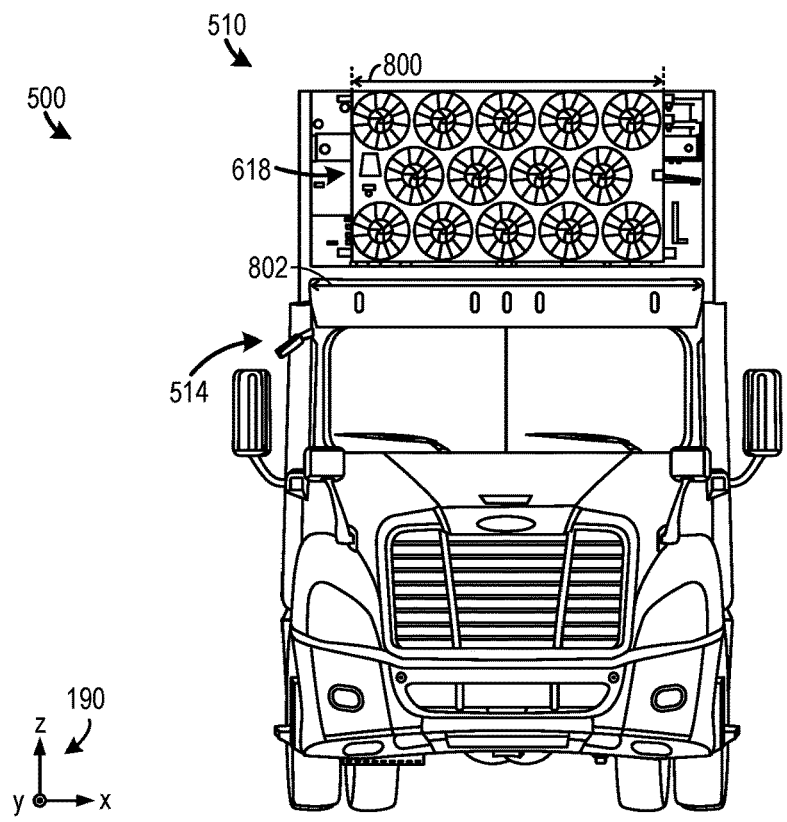

FIG. 8 shows a front view of the vehicle 500 with the fuel cell cooling assembly 510. The fan array 618 is again depicted. This fan array 618 may be controlled based on a temperature of the fuel cells 604, depicted in FIGS. 5-6. As previously discussed, the controller 152 and associated control system, shown in FIG. 1, may be used to command operation of the fuel cell cooling assembly 510 and specifically the fan array 618. Wired and/or wireless electrical connections may be used to send commands between the controller and controllable components. The fan array 618 may extend laterally across the vehicle 500 but may have a smaller width 800 than the width 802 of the cab 512.

FIG. 9A depicts an example of a deflector 900 with an inlet manifold 902 that may be incorporated into any of the aforementioned fuel cell cooling assemblies. As such, the deflector 900 is included in an electric vehicle 910 that includes a fuel cell cooling arrangement. Slats 904 are included in the deflector 900. These slats 904 generate a desired airflow pattern conducive to efficient cooling system operation, during forward vehicle travel. Thus, the slats 904 direct air to the fan/heat exchanger arrangement 906 during forward vehicle travel. It will be appreciated that the 900 may have any of the structural and/or functional characteristics of the vehicles described above with regard to FIGS. 1-8. As such, there may be a gap located between the vehicle cab and the fan/heat exchanger arrangement. Region 940 indicates the location of the detailed view depicted in FIG. 9B.

Figure 9B:
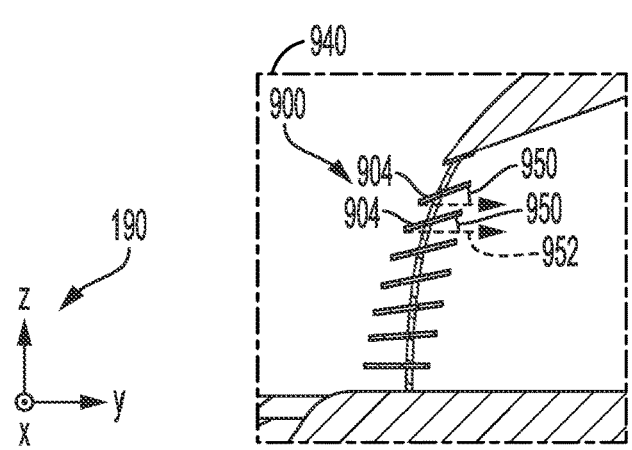

FIG. 9B shows a detailed view of the region 940. The deflector 900 with the slats 904 is again illustrated. Angles 950 of the sequential slats are further depicted. The angles may be measured between a face of the slat and a longitudinal axis 952 (e.g., an axis parallel to the y-axis). The angles sequentially increase as you move up the set of slats. This angular arrangement of the slats decreases wakes in the inlet manifold airflow and allows the manifold to efficiently act as a ram air intake for the fans and heat exchanger.

FIG. 10 shows yet another example of a deflector 1000 with an intake manifold 1002 that directs ram air toward a fan/heat exchanger assembly 1004 during forward vehicle travel. Again, slats 1006 act to guide air into the manifold during forward vehicle travel. The slats 1006 in FIG. 10 are horizontally arranged such that their attack angles are substantially zero. Arranging the slats in this manner may decrease the drag generated by the deflector while allowing the intake manifold to function as a ram air intake. However, placing the slats in a flat arrangement may decrease the airflow provided to the fans when compared to the angled slats shown in FIGS. 9A and 9B. As such, the angular arrangement of the slats may be selected to strike a desired balance between tradeoffs, such as the tradeoff between fuel cell cooling system airflow and vehicle drag.

A longitudinal length 1008 of the slats 1006 may sequential decrease in an upward vertical direction. In this way, a desired airflow pattern may be generated by the slats, which may decrease turbulence within the intake manifold 1002 during forward vehicle travel, thereby increasing cooling system efficiency.

FIG. 11 shows a method 1100 for operation of a fuel cell cooling system. The method 1100 may be used to operate any of the vehicle systems described herein with regard to FIGS. 1-9B or a combination of the vehicle systems. However, in other examples, the method may be used to operate other suitable vehicle systems.

At 1102, the method includes determining operating conditions. The operating conditions may include but are not limited to fuel cell energy output, vehicle speed, vehicle load, fuel cell temperature, ambient temperature, traction battery state of charge (SOC), and the like. These operating conditions may be measured via sensors and/or estimated via modeling.

At 1104, the method includes judging if a speed adjustment of cooling fans in the fuel cell cooling system. This judgement may be carried out based on fuel cell electric energy generation, fuel cell temperature, vehicle speed, ambient temperature, and the like. For instance, the fan speed may be decreased in response to an increase in fuel cell electric energy generation and vice versa.

If it is determined that the cooling fans should not be adjusted (NO at 1104), the method moves to 1106, where the method includes sustaining the current hydrogen fuel cell cooling assembly control strategy. For instance, the cooling fans may be maintained at their current speed or within a desired speed range.

If it is determined that the cooling fans should be adjusted (YES at 1104), the method moves to 1108 where the method includes altering the speed of the cooling fans based on vehicle operating conditions. For instance, the fan speed may be increased in response to an increase in electric energy generation of the fuel cells and/or fuel cell temperature. Conversely, fan speed may be decreased responsive to a decrease in electric energy generation via the fuel cells and/or fuel cell temperature. Method 1100 allows the fuel cells to be efficiently cooled.

The technical effect of the fuel cell cooling system operating method described herein is to strategically adjust the cooling system to increase fuel cell efficiency and reduce the likelihood of the fuel cells reaching undesirable operating temperatures.

FIGS. 1-3 and 5-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle system is provided that comprises a hydrogen fuel cell assembly electrically coupled to a traction motor, positioned behind a cab, and including a plurality of hydrogen storage tanks and hydrogen fuel cells; and a fuel cell cooling assembly including an inlet manifold in a deflector, wherein the deflector is fixedly coupled to and positioned vertically above the cab and designed to direct airflow to a fan array that is coupled to a fuel cell assembly heat exchanger; wherein the fan array is positioned behind inlet manifold and longitudinally offset therefrom.

In another aspect, a method for operation of a heavy duty vehicle system is provided that comprises adjusting a speed of one or more fans in a fan array based on an amount of electrical energy generated by a hydrogen fuel cell assembly and delivered to a distribution box; wherein the hydrogen fuel cell assembly is electrically coupled to a traction motor, positioned behind a cab, and includes a plurality of hydrogen storage tanks and hydrogen fuel cells; and wherein the heavy duty vehicle system includes a fuel cell cooling assembly that comprises an inlet manifold in a deflector which is positioned vertically above and fixedly coupled to the cab; and wherein the inlet manifold is in fluidic communication with and longitudinally offset from the fan array that is coupled to a fuel cell assembly heat exchanger.

In yet another aspect, a heavy duty vehicle system is provided that comprises a hydrogen fuel cell assembly electrically coupled to a traction motor, positioned behind a cab, and including a plurality of hydrogen storage tanks and a plurality of hydrogen fuel cells; a fuel cell cooling assembly including an inlet manifold in a deflector, wherein the deflector is fixedly coupled to and positioned vertically above the cab and designed to direct airflow to a fan array that is coupled to a fuel cell assembly heat exchanger; wherein the fan array is positioned behind inlet manifold and longitudinally offset therefrom; and a frame fixedly coupled to a vehicle chassis and enclosing the plurality of hydrogen storage tanks, the plurality of hydrogen fuel cells, the fan array, and the fuel cell assembly heat exchanger.

In any of the aspects or combinations of the aspects, the deflector may include a plurality of slats that extend across an opening of the inlet manifold.

In any of the aspects or combinations of the aspects, one or more of the plurality of slats may be angled with regard to a longitudinal axis.

In any of the aspects or combinations of the aspects, the hydrogen fuel cell assembly may be positioned within a frame that is fixedly coupled to a vehicle chassis.

In any of the aspects or combinations of the aspects, the plurality of hydrogen storage tanks may be positioned vertically below the plurality of hydrogen fuel cells.

In any of the aspects or combinations of the aspects, the plurality of hydrogen storage tanks may be positioned longitudinally along a length of and above a vehicle chassis.

In any of the aspects or combinations of the aspects, the hydrogen fuel cell assembly may be positioned in front of a rear axle.

In any of the aspects or combinations of the aspects, the fuel cell cooling assembly may include an outlet manifold with an angled wall designed to direct air upward and rearward from the hydrogen fuel cell assembly.

In any of the aspects or combinations of the aspects, the fan array may include a plurality of fans arranged perpendicular to a forward direction of vehicle travel.

In any of the aspects or combinations of the aspects, the vehicle system may further include a controller that includes instructions stored in memory that when executed during operation of the hydrogen fuel cell assembly, cause the controller to: adjust a speed of one or more fans in the fan array based on an amount of electrical energy generated by the hydrogen fuel cell assembly.

In any of the aspects or combinations of the aspects, the hydrogen fuel cell assembly may be electrically coupled to the traction motor via distribution box that is electrically coupled a traction energy storage device assembly.

In any of the aspects or combinations of the aspects, the fuel cell cooling assembly may include an outlet manifold with an angled wall designed to direct air upward and rearward from the hydrogen fuel cell assembly and wherein the outlet manifold is positioned within a frame that encloses the plurality of hydrogen storage tanks and the plurality of hydrogen fuel cells and wherein the frame is fixedly coupled to a vehicle chassis.

In any of the aspects or combinations of the aspects, the fuel cell cooling assembly may include an outlet manifold with an angled wall designed to direct air upward and rearward from the hydrogen fuel cell assembly and wherein an angle is greater than 30 degrees.

In any of the aspects or combinations of the aspects, the outlet manifold may be positioned on an upper side of the frame.

In any of the aspects or combinations of the aspects, the deflector may include a plurality of slats that extend across an opening of the inlet manifold; and one or more of the plurality of slats are angled with regard to a longitudinal axis.

In any of the aspects or combinations of the aspects, the traction motor may provide mechanical power to a rear tandem drive axle assembly.

In any of the aspects or combinations of the aspects, the fan array may include a plurality of fans arranged perpendicular to a forward direction of vehicle travel.

In any of the aspects or combinations of the aspects, a gap may be formed between the deflector and the fan array.

In another representation, a hydrogen range extender cooling system for an electric vehicle is provided the comprises a cab-over wind deflector with a plurality of louvers that form a ram air intake which is profiled to flow air to a radiator coupled to a frame that houses a plurality of fuel cells and hydrogen storage tanks, wherein a gap is formed between the cab and the frame and wherein the frame is fixedly coupled to a vehicle chassis.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other vehicle hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
 a hydrogen fuel cell assembly electrically coupled to a traction motor, positioned behind a cab, and including a plurality of hydrogen storage tanks and a plurality of hydrogen fuel cells;
 a fuel cell cooling assembly including an inlet manifold in a deflector, wherein the deflector is fixedly coupled to and positioned vertically above the cab;
 a fan array positioned directly behind the deflector; and
 a fuel cell assembly heat exchanger that is positioned directly behind the fan array and at a height that is vertically above the cab and at a longitudinal location;
 wherein the fan array is positioned behind the inlet manifold and longitudinally offset therefrom.

2. The vehicle system of claim 1, wherein the deflector includes a plurality of slats that extend across an opening of the inlet manifold.

3. The vehicle system of claim 2, wherein one or more of the plurality of slats are angled with regard to a longitudinal axis.

4. The vehicle system of claim 1, wherein the hydrogen fuel cell assembly is positioned within a frame that is fixedly coupled to a vehicle chassis.

5. The vehicle system of claim 1, wherein the plurality of hydrogen storage tanks are positioned vertically below the plurality of hydrogen fuel cells.

6. The vehicle system of claim 5, wherein the plurality of hydrogen storage tanks are positioned longitudinally along a length of and above a vehicle chassis.

7. The vehicle system of claim 1, wherein the hydrogen fuel cell assembly is positioned in front of a rear axle.

8. The vehicle system of claim 1, wherein the fuel cell cooling assembly includes an outlet manifold with an angled wall designed to direct air upward and rearward from the hydrogen fuel cell assembly.

9. The vehicle system of claim 1, further comprising:
 a battery cooler and a traction battery assembly, wherein the traction battery assembly is electrically coupled to a front junction box, wherein the hydrogen fuel cell assembly is electrically coupled to a rear junction box, and wherein the battery cooler and the traction battery assembly are positioned vertically below the plurality of hydrogen storage tanks.

10. The vehicle system of claim 1, further comprising a controller that includes instructions stored in memory that when executed during operation of the hydrogen fuel cell assembly, cause the controller to:
increase a speed of one or more fans in the fan array in response to an increase in electrical energy generated by the hydrogen fuel cell assembly; and
decrease the speed of one or more fans in the fan array in response to a decrease in electrical energy generated by the hydrogen fuel cell assembly.

11. The vehicle system of claim 1, wherein the hydrogen fuel cell assembly is electrically coupled to the traction motor via distribution box that is electrically coupled a traction energy storage device assembly.

12. A method for operation of a heavy duty vehicle system, comprising:
increasing a speed of one or more fans in a fan array in response to an increase electrical energy generated by a hydrogen fuel cell assembly and delivered to a distribution box; and
decreasing the speed of the one or more fans in response to a decrease in the electrical energy generated by the hydrogen fuel cell assembly and delivered to the distribution box;
wherein the hydrogen fuel cell assembly is electrically coupled to a traction motor, positioned behind a cab, and includes a plurality of hydrogen storage tanks and a plurality of hydrogen fuel cells;
wherein the heavy duty vehicle system includes a fuel cell cooling assembly that comprises an inlet manifold in a deflector which is positioned vertically above and fixedly coupled to the cab; and
wherein the inlet manifold is in fluidic communication with and longitudinally offset from the fan array that is coupled to a fuel cell assembly heat exchanger.

13. The method of claim 12, wherein the fuel cell cooling assembly includes an outlet manifold with an angled wall that is designed to direct air upward and rearward from the hydrogen fuel cell assembly and wherein the outlet manifold is positioned within a frame that encloses the plurality of hydrogen storage tanks and the plurality of hydrogen fuel cells and wherein the frame is fixedly coupled to a vehicle chassis.

14. A heavy duty vehicle system, comprising:
a hydrogen fuel cell assembly electrically coupled to a traction motor, positioned behind a cab, and including a plurality of hydrogen storage tanks and a plurality of hydrogen fuel cells;
a fuel cell cooling assembly including:
an inlet manifold in a deflector that is positioned directly above the cab;
a fan array that is positioned directly behind the deflector; and
a fuel cell assembly heat exchanger that is positioned directly behind the fan array and at a height that is above the cab; and
a frame fixedly coupled to a vehicle chassis and enclosing the plurality of hydrogen storage tanks, the plurality of hydrogen fuel cells, the fan array, and the fuel cell assembly heat exchanger.

15. The heavy duty vehicle system of claim 14, wherein the fuel cell cooling assembly includes an outlet manifold with an angled wall designed to direct air upward and rearward from the hydrogen fuel cell assembly and wherein an angle is greater than 30 degrees.

16. The heavy duty vehicle system of claim 15, wherein the outlet manifold is positioned on an upper side of the frame.

17. The heavy duty vehicle system of claim 14, wherein:
the deflector includes a plurality of slats that extend across an opening of the inlet manifold; and
one or more of the plurality of slats are angled with regard to a longitudinal axis.

18. The heavy duty vehicle system of claim 14, wherein the traction motor provides mechanical power to a rear tandem drive axle assembly.

19. The heavy duty vehicle system of claim 14, wherein the fan array includes a plurality of fans arranged perpendicular to a forward direction of vehicle travel.

20. The heavy duty vehicle system of claim 14, wherein a gap is formed between the deflector and the fan array.

* * * * *